Patented Nov. 27, 1934

1,982,029

UNITED STATES PATENT OFFICE 1,982,029

PROCESS FOR TREATING FOOD SUBSTANCES

George Sperti, Covington, Ky., and Robert J. Norris, Robert B. Withrow, and Herman Schneider, Cincinnati, Ohio, assignors to General Development Laboratories, Inc., New York, N. Y., a corporation of Delaware No Drawing. Application February 5, 1931, Serial No. 513,774

4 Claims. (Cl. 99—11)

This invention relates to a process for treating food substances by irradiation with light to destroy any bacteriological growths which may be present and to stimulate or increase vitamin content. This application is a continuation in part of our prior application Serial No. 205,841, filed July 14, 1927.

It has been known heretofore that bacteriological growths, moulds and the like, can be destroyed by irradiation with ultra-violet light. However, the use of unshielded ultra-violet light for sterilizing purposes, is in most instances unsuitable for preservation of food products because of the fact that subjection of such products to the full actinic rays obtained from artificial light sources, such as the electric arc, metallic vapor lamps, and the like, if intensely enough applied to result in substantial sterilization, will destroy the taste and food value of the product treated.

It has also been known heretofore that the vitamin content of food products can be stimulated or increased by irradiation with ultra-violet light, but it has been stated, as a result of careful scientific tests, that vitamin content is also destroyed by prolonged exposure to ultra-violet light.

In our prior application, Serial No. 168,226, filed February 14, 1927, which has now become United States Patent No. 1,676,579, dated July 10, 1928, the discovery is announced that there is a critical wave length at which biological as well as other reactions caused by light begin to take place and that such reactions continue for wave lengths shorter than the critical wave length. Therefore a desired reaction beginning at one critical wave length may be caused, while an undesired reaction which begins at a shorter critical wave length may be prevented by excluding waves shorter than the second critical wave length, and accordingly we stated that portions of substances could be activated instead of being inactivated, without activating undesirable portions thereof, and that it should be possible to employ only waves which activate vitamins and thus to avoid any danger due to overexposure which has been found in the past to inactivate the vitamin.

In our experiments with treating food products with ultra-violet light, we have found that the short wave lengths destructive to delicate organic or inorganic chemical compounds that impart color, taste and smell to food products, may be excluded while the rays of light which destroy bacteriological and other growths such as moulds and spores may be retained. We have also found that if ultra-violet light including destructive short wave lengths is applied for any length of time, the short wave lengths will destroy the vitamin content along with the chemical constituents which make up the taste, smell and color of the food, whereas if the light does not contain these destructive short wave lengths, the vitamin content will be stimulated or increased without impairing the characteristics of the product prior to irradiation.

Accordingly, when food products are irradiated with ultra-violet light which does not contain destructive short wave lengths, substantial or complete sterilization will be obtained and vitamin content will be stimulated or increased without change in the natural characteristics of the product. In general, the short wave length limit which will be found most suitable is the shortest wave which will pass through a 5% solution of lead acetate about one centimeter thick, and in our measurements, we have determined that this limit is about 2750 Angstrom units. Variations are, however, permissible dependent upon the particular materials treated and objects to be obtained. Subjection of food products to light which contains no waves substantially shorter than those which will pass the 5% lead acetate screen will destroy bacteriological growth in said products and will stimulate and increase their vitmain content, without destroying the taste, smell and appearance of the products, even with great light intensity and prolonged exposure. Enzymes, however, are in general not harmed unless wave lengths shorter than 2750 Angstrom units are included in the light.

Filter screens for actinic light can be made in a number of ways. For example, a piece of quartz glass having a rim may be filled to a suitable depth such as one centimeter with a solution of 5% lead acetate in pure water. Sheets of gelatin built up to a suitable thickness can be used for a screen, and certain types of glass can be obtained which will not transmit the undesirable short waves. It is also possible to select certain metals for electrodes to generate a light which will not contain appreciable quantities of waves of shorter length than those desired.

In treating liquids containing floating solids it may be desirable to filter out the solids before irradiating the liquid in order to prevent interference with penetration of the light. The solids may be sterilized in other known ways, if desired, until free or relatively free of bacteria and then replaced in the sterilized liquid.

Products treated according to the process described above are without change in smell, taste or color and without perceptible change in any other respect except destruction of bacteria and the like and creation or increase of vitamins. There is no heating to any degree sufficient to break down organic compounds in the products, nor is any artificial preservative added. In milk, for example, the full original content will be present unchanged except for live bacteria which will be reduced in number and except for increased vitamin content. The absence of products produced in milk by pasteurization and the absence of chemicals are of great advantage.

It will be understood that the time of exposure is not critical as there is no danger from over-irradiation, and also that the process is not limited strictly to a short wave length limit of 2750 Angstrom units as the nature of the materials treated may permit variations of this limit. Moreover, the process is not limited to the treatment of milk, as the results described above will be produced in any food product containing bacteriological impurities and pro-vitamins.

What is claimed is:

1. The process for sterilizing food products made up of liquids and solids, which consists in filtering off the solids, treating the liquids with light which does not contain rays of a wave length substantially less than 2750 Angstrom units, so as to sterilize the same, and sterilizing the solids separately and returning them to the sterilized liquids.

2. A process for treating food products which consists in simultaneously increasing the vitamin content of the food and destroying the bacteriological impurities therein by irradiation with ultra-violet light while excluding from said light those shorter wave lengths that are harmful to the taste, smell and color of the food.

3. A process for creating or increasing vitamin content in food products containing pro-vitamins without changing their natural characteristics of taste, smell and color which consists in irradiating such products with ultra-violet light containing no waves substantially shorter than 2750 Angstrom units.

4. A process for treating activatable food products which consists in irradiating such products with ultra-violet light, filtering out from said light the short wave lengths that are harmful to the taste, smell and color of such products, and subjecting the products to the action of the remaining wave lengths, thereby stimulating or increasing the vitamin content of the food.

HERMAN SCHNEIDER.
ROBERT B. WITHROW.
GEORGE SPERTI.
ROBERT J. NORRIS.